(12) United States Patent
Marui

(10) Patent No.: US 6,339,656 B1
(45) Date of Patent: Jan. 15, 2002

(54) MOVING PICTURE ENCODING DECODING PROCESSING APPARATUS

(75) Inventor: Shinichi Marui, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/218,484

(22) Filed: Dec. 22, 1998

(30) Foreign Application Priority Data

Dec. 25, 1997 (JP) ............................................. 9-358603

(51) Int. Cl.$^7$ ................................................. G06K 9/36
(52) U.S. Cl. ..................................................... 382/236
(58) Field of Search ................................ 382/232, 236, 382/238, 240, 242, 248, 250; 358/432, 433; 348/384, 390, 394–395, 400–404, 407–416, 420–421, 425, 430, 431, 699

(56) References Cited

U.S. PATENT DOCUMENTS

| | | | |
|---|---|---|---|
| 5,576,902 A | * 11/1996 | Lane et al. | 386/68 |
| 5,583,650 A | * 12/1996 | Lane et al. | 386/81 |
| 5,745,183 A | * 4/1998 | Lam | 348/416 |
| 6,058,143 A | * 5/2000 | Golin | 375/240 |
| 6,148,033 A | * 11/2000 | Pearlstein et al. | 375/240.16 |
| 6,173,013 B1 | * 1/2001 | Suzuki et al. | 375/240.16 |

* cited by examiner

Primary Examiner—Jose L. Couso
(74) Attorney, Agent, or Firm—Merchant & Gould PC

(57) ABSTRACT

A moving picture encoding decoding processing apparatus for detecting a motion vector by forming the image data of the search area for motion vector with small capacity of memory rapidly and efficiently. A moving picture encoding decoding processing apparatus detects the macroblock number by a macroblock counter. A macroblock recognition part recognizes whether the search area for the motion vector of the macroblock is extending over the frame image area or not based on the position of the macroblock in the frame image. A macroblock recognition part generates an extrapolation pattern signal which indicates the pattern of the extrapolation for the inputted macroblock. If the whole search area is within the frame area, image data formed on a frame memory 2 are used. If the search area extends beyond the frame area, image data formed on a prediction memory 3 are used. A control unit 1 includes an image data transmission means. Image data of the current processing macroblock data and surrounding data existing on the frame memory are transferred from the frame memory 2 to the prediction memory 3. The prediction memory 3 includes an image data extrapolation means. The image data extrapolation means performs the extrapolation by specifying row address and column address necessary for the extrapolation based on the transmitted image data from the frame memory and the extrapolation pattern signal.

7 Claims, 17 Drawing Sheets

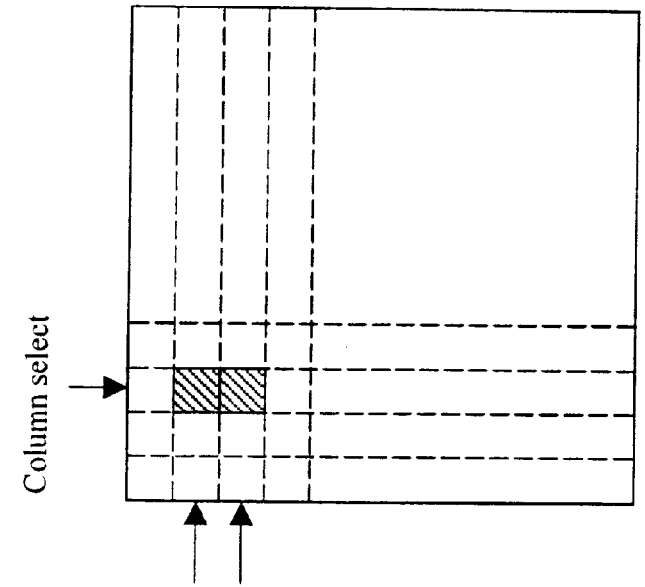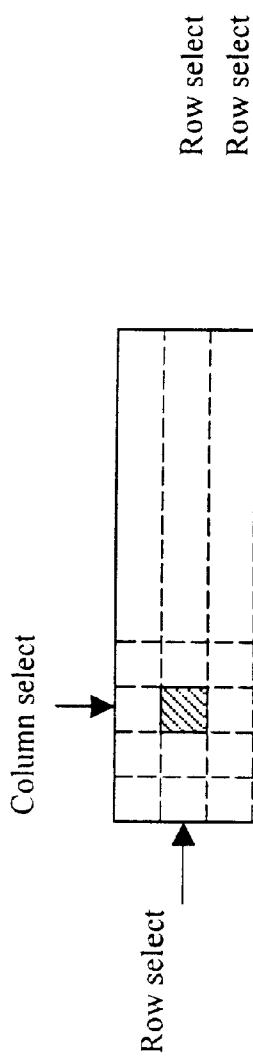
Fig. 9

| | Read Write signal | Extrapolation pattern signal 1 0 2 | Address data 1 0 1 | Selected row address R outputted from the row decoder 1 1 0 |
|---|---|---|---|---|
| 1 | Read | — | $1 + 46(K-1) \sim 46K$ (K=1,2,...,46) | R = K |
| 2 | Write | 1 | $16 + 46(16-1) \sim 46 \times 16$ | R = 1, 2, ..., 16 |
| 3 | Write | 2 | $16 + 46(K-1) \sim 46K$ (K=17,18,...,46) | R = K |
| 4 | Write | 3 | $1 + 46(16-1) \sim 46 \times 16$ | R = 1, 2, ..., 16 |
| 5 | Write | 4 | $1 + 46(K-1) \sim 46K$ (K=17,18,...,46) | R = K |
| 6 | Write | 5 | $1 + 46(16-1) \sim 31 + 46(16-1)$ $1 + 46(K-1) \sim 31 + 46(K-1)$ (K=17,18,...,46) | R = K |
| 7 | Write | 6 | $16 + 46(K-1) \sim 46K$ (K=1,2,...,46) | R = 1, 2, ..., 46 |
| 8 | Write | 7 | $16 + 46(K-1) \sim 46K$ (K=1,2,...,30) $16 + 46(31-1) \sim 46 \times 31$ | R = 31, 32, ..., 46 |
| 9 | Write | 8 | $1 + 46(K-1) \sim 46 \times 31$ (K=1,2,...,30) $1 + 46(K-1) \sim 31 + 46(K-1)$ (K=1,2,...,30) $1 + 46(31-1) \sim 31 + 46(31-1)$ | R = 31, 32, ..., 46 |

*Fig.14*

| | Read Write signal | Extrapolation pattern signal 1 0 2 | Address data 1 0 1 | Selected column address C outputted from the column decoder 1 2 0 |
|---|---|---|---|---|
| 1 | Read | — — — | L + 46(K-1)  (K=1,2,⋯,46) (L=1,2,⋯,46) | C = L |
| 2 | Write | 1 | 16 + 46(K-1)  (K=16,17,⋯,46) | C = 1,2, ⋯, 16 |
| 3 | Write | 2 | L + 46(K-1)  (K=16,17,⋯,46) (L=17,18,⋯,46) | C = L |
| 4 | Write | 3 | L + 46(K-1)  (K=16,17,⋯,46) (L=1,2,⋯,46) | C = L |
| 5 | Write | 4 | 31 + 46(K-1)  (K=16,17,⋯,46) | C = 31,32, ⋯, 46 |
| 6 | Write | 5 | L + 46(K-1)  (K=1,2,⋯,46) (L=1,2,⋯,30) | C = L |
| 7 | Write | 6 | 31 + 46(K-1)  (K=1,2,⋯,46) | C = 31,32, ⋯, 46 |
| 8 | Write | 7 | 16 + 46(K-1)  (K=1,2,⋯,46) | C = 1,2, ⋯,16 |
| 9 | Write | 8 | L + 46(K-1)  (K=1,2,⋯,46) (L=17,18,⋯,46) | C = L |
| 10 | Write | 9 | 16 + 46(K-1)  (K=1,2,⋯,31) | C = 1,2, ⋯,16 |
| 11 | Write | 10 | L + 46(K-1)  (K=1,2,⋯,31) (L=17,18,⋯,46) | C = L |
| 12 | Write | 11 | L + 46(K-1)  (K=1,2,⋯,31) (L=1,2,⋯,46) | C = L |
| 13 | Write | 12 | L + 46(K-1)  (K=1,2,⋯,31) (L=1,2,⋯,30) | C = L |
| 14 | Write | 13 | 31 + 46(K-1)  (K=1,2,⋯,31) | C = 31,32, ⋯, 46 |

Fig.15

MOVING PICTURE ENCODING DECODING PROCESSING APPARATUS

BACKGROUND OF THE INVENTION

1. Field of the Invention

The present invention relates to an apparatus for performing moving picture encoding decoding processing, especially an apparatus which uses a motion vector for the encoding process.

2. Description of the Related Art

Recently, the technical development of the digital telecommunication system has progressed remarkably, and various technologies such as multimedia communication and the personal mobile communication are discussed and researched actively. Various types of data are used and transmitted in such multimedia communication including voice data, moving picture data, and still image data. Therefore, high speed communication technology for picture data will be a key and important technology in the forthcoming multimedia communication system. Because the data amount of image data is huge, the data encoding decoding technology is an important technology. As for the encoding decoding algorithm, there are MPEG1, MPEG2, H.261 and H.263 in ITU-T etc. Standardization of those algorithms is discussed and determined according to the usage and purpose.

In these encoding decoding algorithms, an intraframe encoding process including orthogonal transformations and an interframe encoding process including motion compensation are performed. Through those encoding decoding processes, a process that relates to the motion vector detection occupies the major part of the whole processing in the algorithm. The data encoding decoding using the motion vectors is indispensable processing for the improvement of the picture quality. Interframe encoding first calculates a data difference between former image data and the current input image and performs encoding using the calculated interframe difference (as shown in FIG. 16, data difference 1 is calculated based on a former image data al and an input image data b). If a data difference becomes small, encoding efficiency becomes large. However, when image data with much motion is compressed, the interframe difference becomes large. In this case, use of interframe difference processing will not contribute to improve the encoding efficiency very much. Then, the encoding efficiency can be improved by performing motion compensation preliminarily, where former image data is moved based on the forecasting of the movement of former image data, and then performing interframe data difference processing (as shown in FIG. 16, difference 2 is calculated based on an amended data a2 from former image with motion compensation and an input current image data b). This movement direction with forecasting image data motion is defined as a motion vector.

Hereafter, the outline of the motion vector detection is shown below. The compressed algorithm performs encoding process by a macroblock unit which composes 16 pixels×16 pixels matrix data, and the motion vector is detected by the macroblock unit. The macroblock for calculating motion vector is moved around by a pixel length step in the search area (FIG. 17(a)). Next, the correlation of the moved macroblock and the corresponding macroblock of the input image is calculated. The correlation is calculated as the absolute value harmony of the respective difference of the corresponding pixel data.

The absolute value harmony of the difference of the macroblock is calculated respectively after moving in all the search areas, and the maximum correlation is detected among the calculated correlation, and the amount of the movement of the detected moved macroblock is assumed to be a motion vector.

However, if for example macroblock 200 located on the boundary of the frame comes to the target macroblock for detecting motion vector as shown in FIG. 17 (b), the search area 210 for the macroblock 200 covers the area beyond the frame. In a conventional encoding process, such a motion vector was supposed not to be handled. When an image picture moves in the direction where actual image data go outside of the frame, motion compensation cannot be used for the interframe encoding. So the encoding efficiency has dropped remarkably. Moreover, the picture quality might worsen as a result due to the noise such as block distortions. Then, unrestricted motion vector is added as an option in H.263 etc. in order to raise accuracy. The unrestricted motion vector is used for calculating the motion vector when actual image data go outside of the frame, assuming that whole data of the search area 210 exist by providing pixel data to the vacant area of the search area 210 outside of the frame. When correct image data for outside area cannot be obtained from the frame data, the data of frame boundary is assumed to be the nearest data. As for the implementation method for achieving the above mentioned unrestricted motion vector calculation processing, the following implementation methods normally can be considered. The first implementation method is the software processing without dedicated hardware such as LSI. According to the flow chart as shown in FIG. 4, with the pixel data moving, the address after moving is determined to be within the frame or outside the frame by adding or subtracting moving distance to the address before moving. If the address after moving is outside the frame, the pixel data difference is processed based on the nearest boundary pixel data of the frame and the input current pixel.

The second implementation method is the hardware by expanding the set frame memory area in order to cover all search area composed of the frame data area and the outer surrounding area, and all data of the search area which are the frame data and the outer surrounding area data are transmitted precedingly, and correlation processing is performed based on the data on the expanded frame memory and the input data.

However, according to the above mentioned first implementation by software means, when motion vector calculation process for the macroblock, the conditional branch processes are included in all calculation every after moving around in the search area, the processing becomes complex. In addition, if a processor uses the pipeline processing, the so called "pipeline penalty" is caused when the conditional branch process occurs and the processing efficiency deteriorates greatly.

Moreover, according to the above mentioned second implementation by hardware means of expanding memory area, the necessary memory capacity consumption becomes large.

SUMMARY OF THE INVENTION

Therefore, with the foregoing in mind, it is an object of the present invention to provide a moving picture data encoding decoding processing apparatus which can detect the unrestricted motion vector with a dedicated memory having a small capacity without increasing the software process.

In order to achieve the objects, a moving picture encoding decoding processing apparatus includes a frame memory, a prediction memory for storing the image data of a search area for a motion vector detection, an image data transmission means for transmitting image data of a first macroblock and surrounding image data existing in the frame memory from the frame memory to the prediction memory and writing the transmitted data to the corresponding area wherein the first macroblock is the macroblock whose search area extends over the frame image area, an image data extrapolation means for forming an image data to the extrapolation area of the search area where an image data had not been written onto the prediction memory by extrapolation based on the pixel data located on the boundary with the search area, and a motion vector detecting part for detecting the unrestricted motion vector based on the image data of the search area formed on the prediction memory.

This embodiment makes it possible to form the image data for the search area onto the prediction memory rapidly and efficiently and to detect unrestricted motion vector. The image data for the search area in the prediction memory is formed by transmitting and writing the first macroblock currently processed as a target for encoding and surrounding image data of the first macroblock from frame memory to the prediction memory and writing the same data with the image data positioned on the boundary data of the first macroblock to the rest of extrapolation area. The memory consumption capacity of the prediction memory can be reduced to the capacity for the first macroblock and the surrounding image data of the first macroblock.

Next, the moving picture encoding decoding processing apparatus of the present invention preferably includes a macroblock recognition part for recognizing whether an input macroblock is a macroblock whose full motion vector search area is within the frame image data area or a macroblock whose motion vector search area has at least a part extending over the frame image data area. The motion vector detection part preferably detects the motion vector based on the image data formed on the frame memory if an inputted macroblock is the macroblock whose full motion vector search area is within the frame image data area, and detects the motion vector based on the image data formed on the prediction memory if an inputted macroblock is a macroblock whose motion vector search area has at least a part extending over the frame image data area.

This embodiment makes it possible to perform the motion vector detection by using the prediction memory only when the currently processed macroblock is a macroblock whose search area is extending over the frame image area. The processing amount for the motion vector detection can be reduced and the process can be performed efficiently.

Next, the macroblock recognition part preferably recognizes an inputted macroblock as a macroblock whose motion vector search area is extending over the frame image data area if the position of the inputted macroblock is in a surrounding edge area of the frame image. The macroblock recognition part preferably recognizes an inputted macroblock as a macroblock whose full motion vector search area is within the frame image data area if the position of the inputted macroblock is in an internal area excluding the surrounding edge area of the frame image.

This embodiment makes it possible to detect whether the prediction memory is used for detecting the motion vector for the inputted macroblock. It can simply detect by the macroblock number whether the macroblock is located on the surrounding edge of the frame image or is located on the internal side of the frame image without a complex conditional branch sequence. Here, the macroblock positioned on the surrounding edge means the macroblock located near the edge of the frame image and having the search area extending over the frame image area. The inputted macroblock uniquely is detected as the surrounding edge macroblock based on its location and set length of the search area.

Next, the prediction memory is preferably composed of $(N+2M) \times (N+2M)$ capacity of memory when the macroblock is composed of N×N pixels and the search area has M data pixel length to upper side, lower side, right-hand side, left-hand side. This embodiment makes it possible to provide the prediction memory with an appropriate capacity based on the set search area length. By this way, the search area can be set appropriately and memory consumption capacity can be reduced by providing a necessary amount of memory for the prediction memory.

Next, the image data extrapolation preferably includes a first extrapolation means for writing the pixel data located on boundary with the search area to the same row address of the extrapolation area in which image data are positioned in the nearest pixel to the extrapolation area when inputted macroblock image data are mapped on the prediction memory if there are image data having the same row address as the extrapolation area in the inputted first macroblock data. The image data extrapolation also includes a second extrapolation means for writing the pixel data located on the boundary with the search area to the same column address of the extrapolation area in which image data are positioned in the nearest pixel to the extrapolation area when inputted macroblock image data are mapped on the prediction memory if there are image data having the same column address as the extrapolation area in the inputted first macroblock data. Moreover the image data extrapolation preferably includes a third extrapolation means for writing the corner pixel data located on the boundary with the search area to the faced extrapolation area which image data is positioned in the nearest corner pixel to the extrapolation area when inputted macroblock image data are mapped on the prediction memory if there are no image data having the same row address or the same column address as the extrapolation area in the inputted first macroblock data.

This embodiment makes it possible to perform extrapolation by specifying the image data of the frame image which is located the nearest to the extrapolation area uniquely as image data for extrapolation and to form the image data for motion vector detection onto the prediction memory.

Next, the macroblock recognition part preferably outputs an extrapolation pattern signal indicating the position of the macroblock in the surrounding edge if the inputted macroblock is in the surrounding edge. The image data extrapolation means preferably performs the extrapolation based on the extrapolation pattern.

This embodiment makes it possible to specify the extrapolation pattern by the extrapolation pattern signal. The extrapolation pattern is uniquely decided based on the position of the inputted macroblock in the frame image. The prediction memory can perform the extrapolation simply and rapidly and form the image data of search area onto it.

Next, the image data extrapolation means preferably includes a row decoder generating one or plural set of row addresses for the prediction memory by decoding based on the address signal indicating the accessing address of the prediction memory, the extrapolation pattern signal and the read/write signal for the prediction memory. Moreover, the image data extrapolation means preferably includes a column decoder generating one or plural set of column addresses for the prediction memory by decoding based on the address signal indicating the accessing address of the prediction memory, the extrapolation pattern signal and the read/write signal for the prediction memory.

This embodiment makes it possible to specify the address of the prediction memory for the first macroblock to be written. Moreover, the extrapolation means of the prediction memory can specify the row address and column address of the extrapolation area for image data extrapolation based on the extrapolation pattern signal. The image data for the search area can be formed onto the prediction memory rapidly.

These and other advantages of the present invention will become apparent to those skilled in the art upon reading and understanding the following detailed description with reference to the accompanying figures.

BRIEF DESCRIPTION OF THE DRAWINGS

FIG. 9 is a schematic diagram showing writing to the plural address of the prediction memory cell 100 by the extrapolation.

FIG. 14 is a table memorized in a row decoder.

FIG. 15 is a table memorized in a column decoder.

DESCRIPTION OF THE PREFERRED EMBODIMENTS

Hereinafter, the present invention of the moving picture data encoding decoding processing apparatus will be described by way of embodiments with reference to the accompanying drawings.

Figure 1:
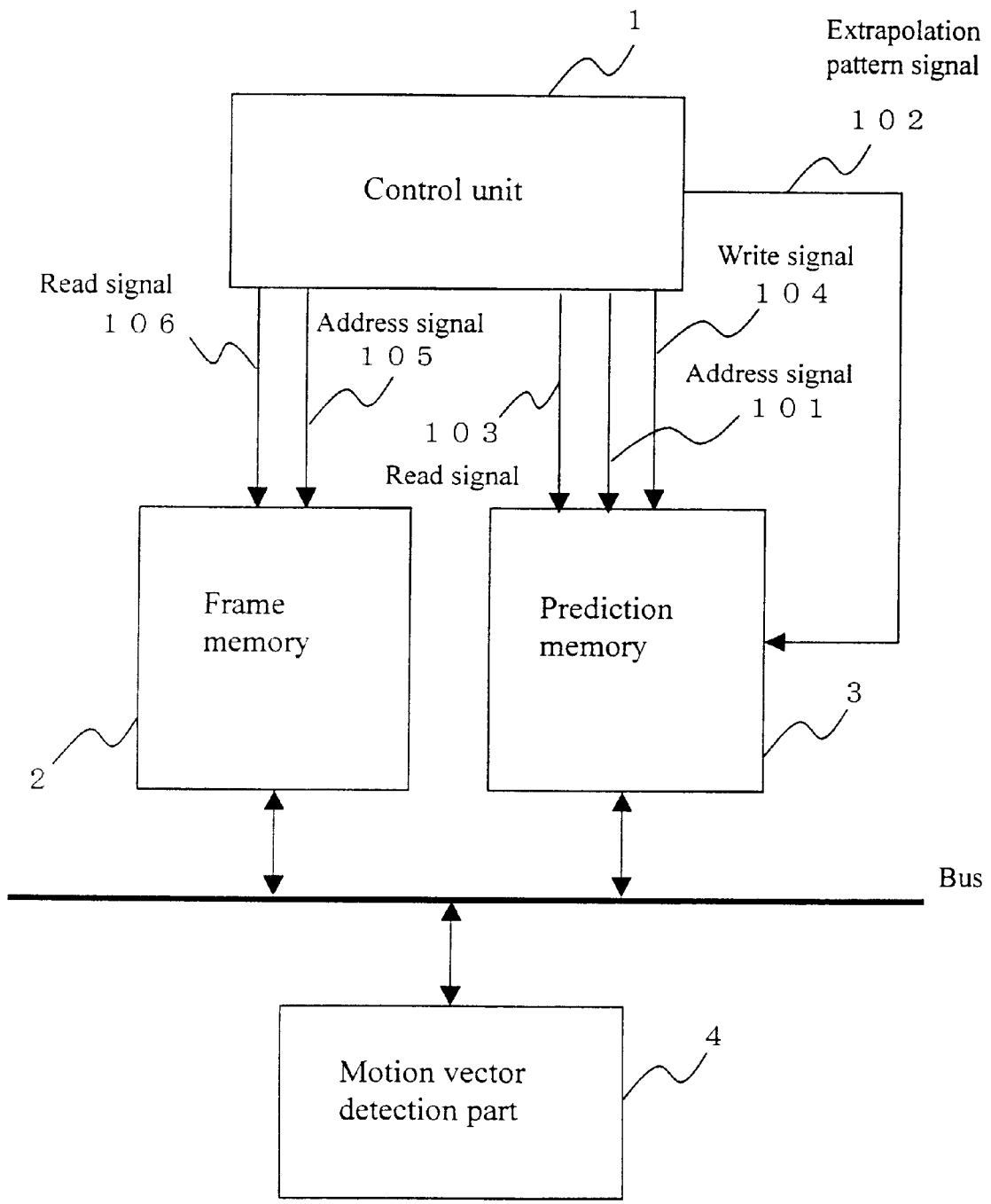
FIG. 1 is a schematic block diagram showing a moving picture encoding decoding processing apparatus according to an embodiment of the present invention.
Figure 2:
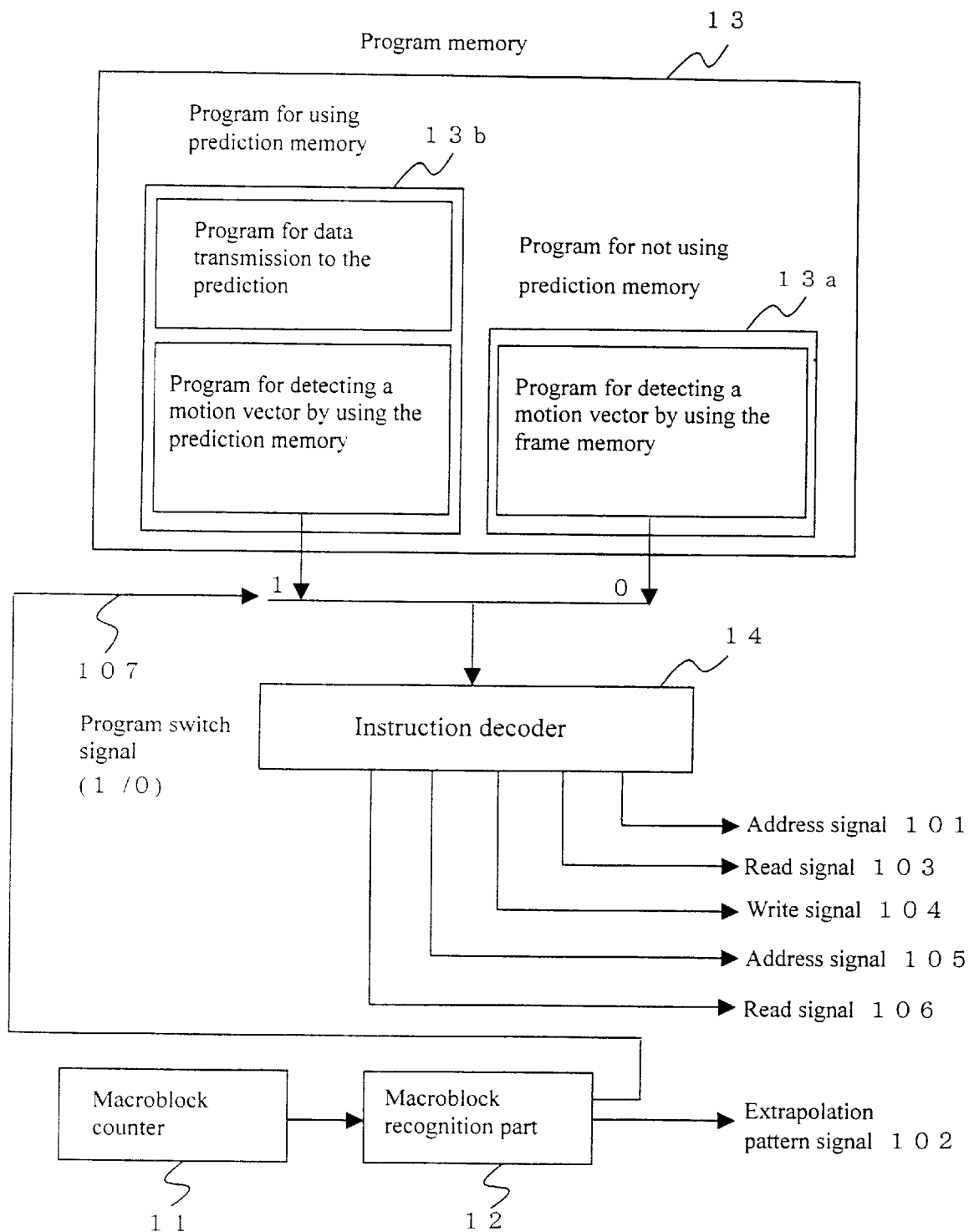
FIG. 2 is a schematic block diagram showing a main configuration of the control unit shown in FIG. 1.
Figure 3:
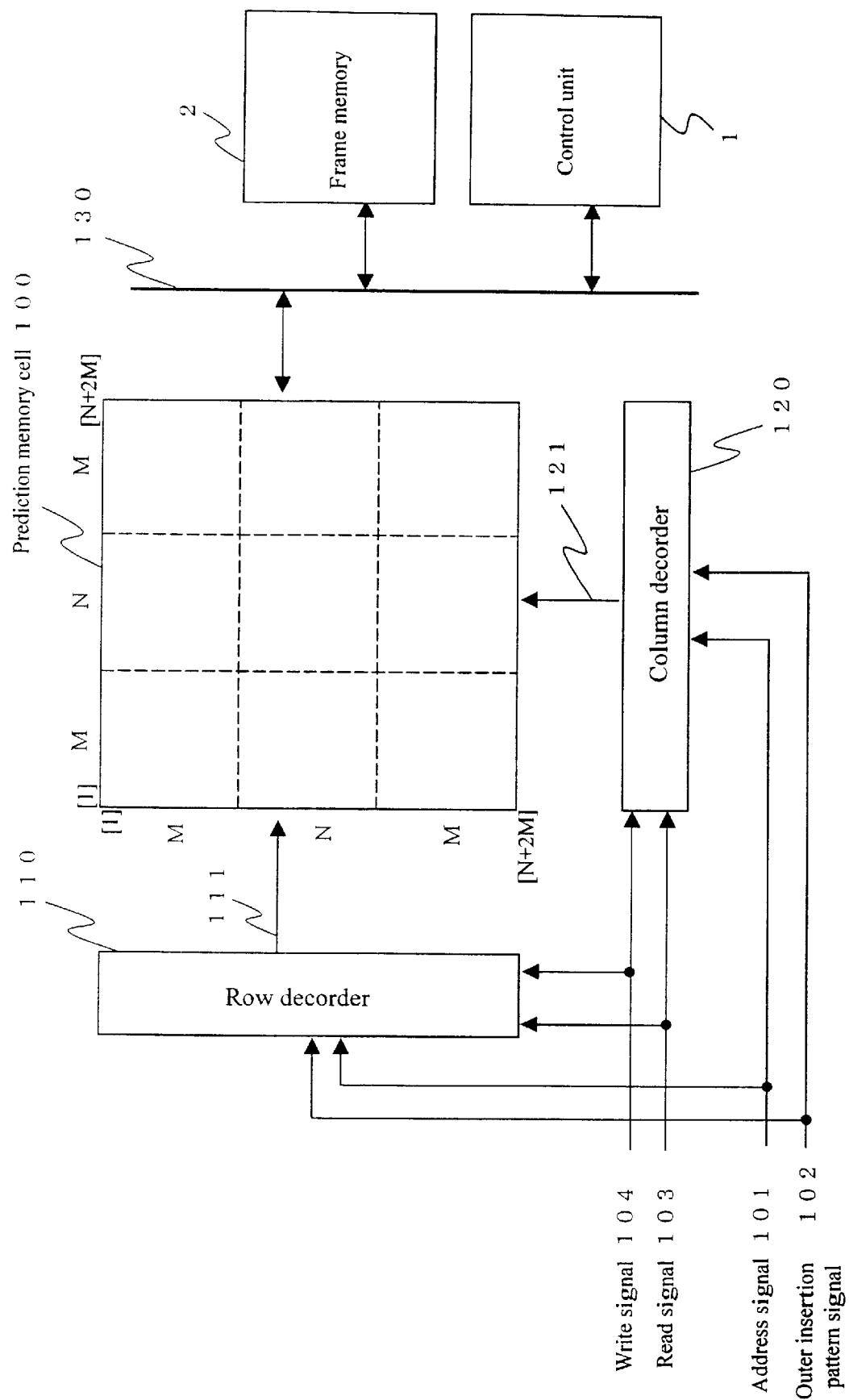
FIG. 3 is a schematic block diagram showing a main configuration of the prediction memory shown in FIG. 1.
Figure 4:
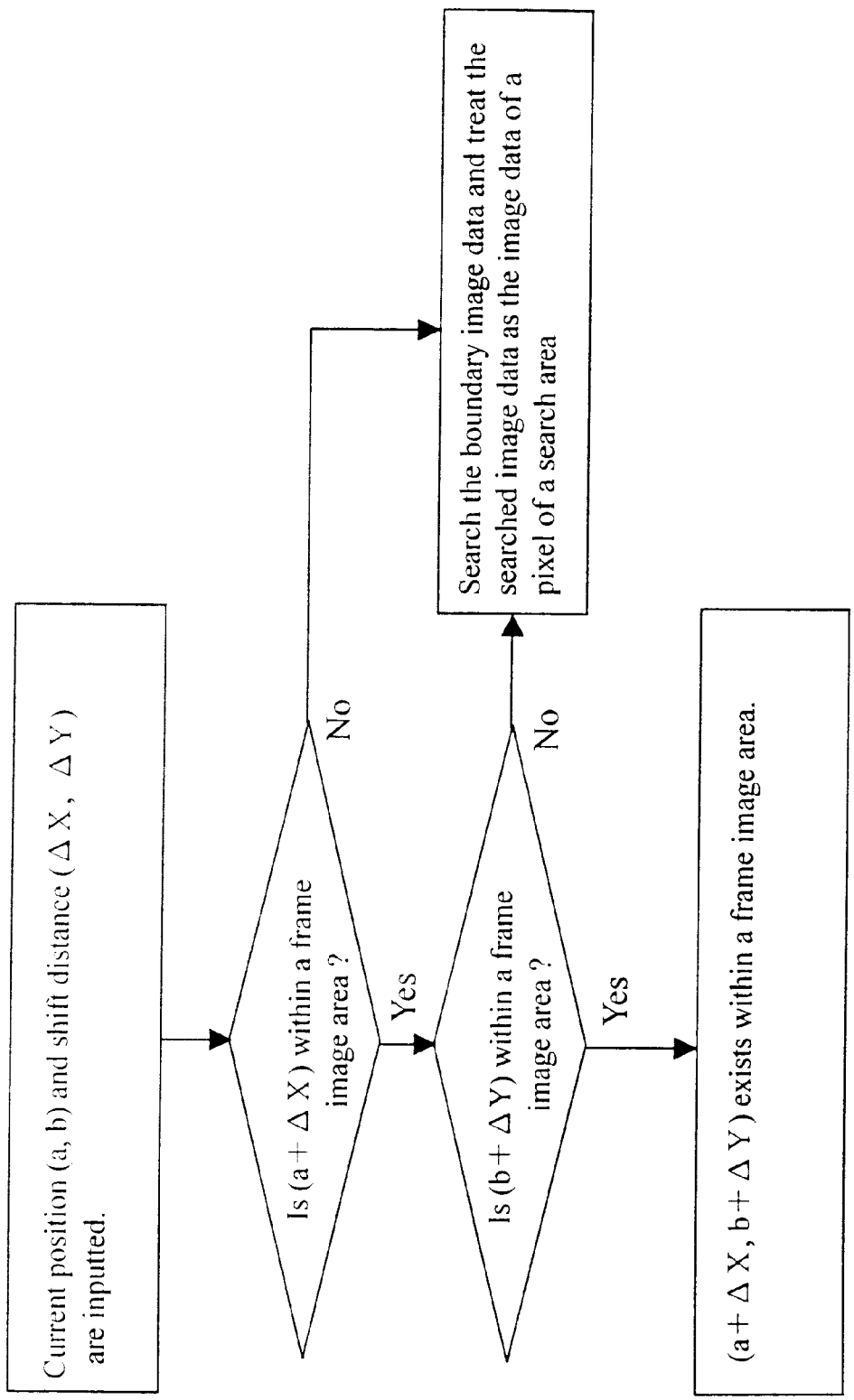
FIG. 4 is a flow chart showing a procedure for the outer data insertion to the outside of the frame by the software.

FIG. 1 is a schematic block diagram showing a moving picture encoding decoding processing apparatus according to this embodiment of the present invention, FIG. 2 is a schematic block diagram showing a main configuration of the control unit shown in FIG. 1, and FIG. 3 is a schematic block diagram showing a main configuration of the prediction memory shown in FIG. 1. As shown in FIG. 1, the moving picture encoding decoding processing apparatus of this embodiment 1 generally includes a control unit 1, a frame memory 2, a prediction memory 3, and motion vector detecting part 4. The control unit 1 provides an image data transmitting means, and the prediction memory 3 provides the image data extrapolation means. A detailed processing is described later, and a rough flow of the entire processing is described here. The control unit 1 detects the macroblock number of the macroblock currently undergoing motion vector detection processing, and motion vector detection part 4 detects the motion vector by using the image data of frame memory 2 for the macroblock where the whole search area exists within the frame memory area. When the control unit 1 detects the processing for the macroblock with search area extending beyond the frame area, control unit 1 transmits image data from the frame memory 2 to the prediction memory 3 by the image data transmitting means and supplies the extrapolation pattern signal to the prediction memory 3. Prediction memory 3 forms image data including surrounding image data of the frame image by the image data extrapolation means according to the extrapolation pattern signal, and the motion vector detecting part 4 detects the unrestricted motion vector. First of all, the processing related to control unit 1 is described in detail.

Figure 5:
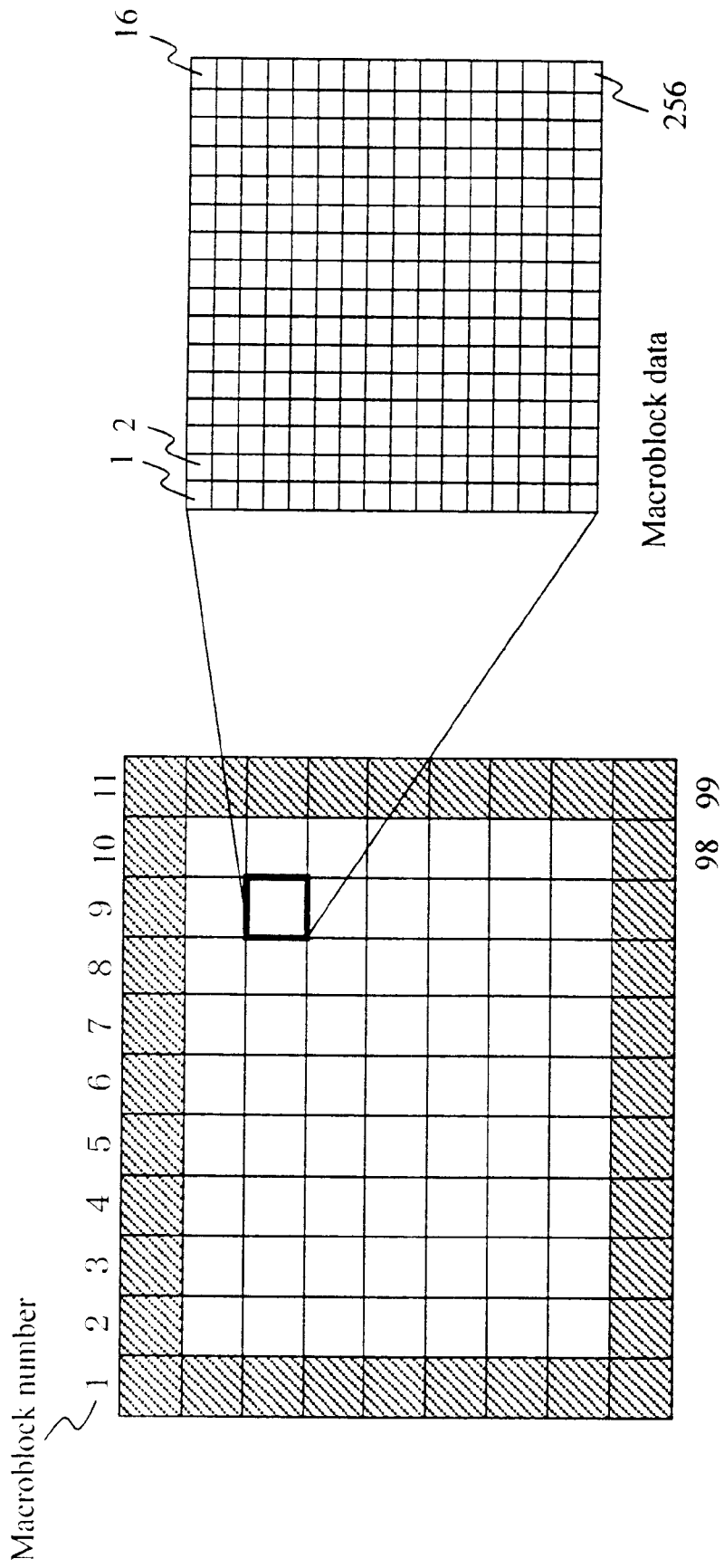
FIG. 5 is a schematic diagram showing a number of the macroblock and pixel data included in one macroblock.
Figure 6:
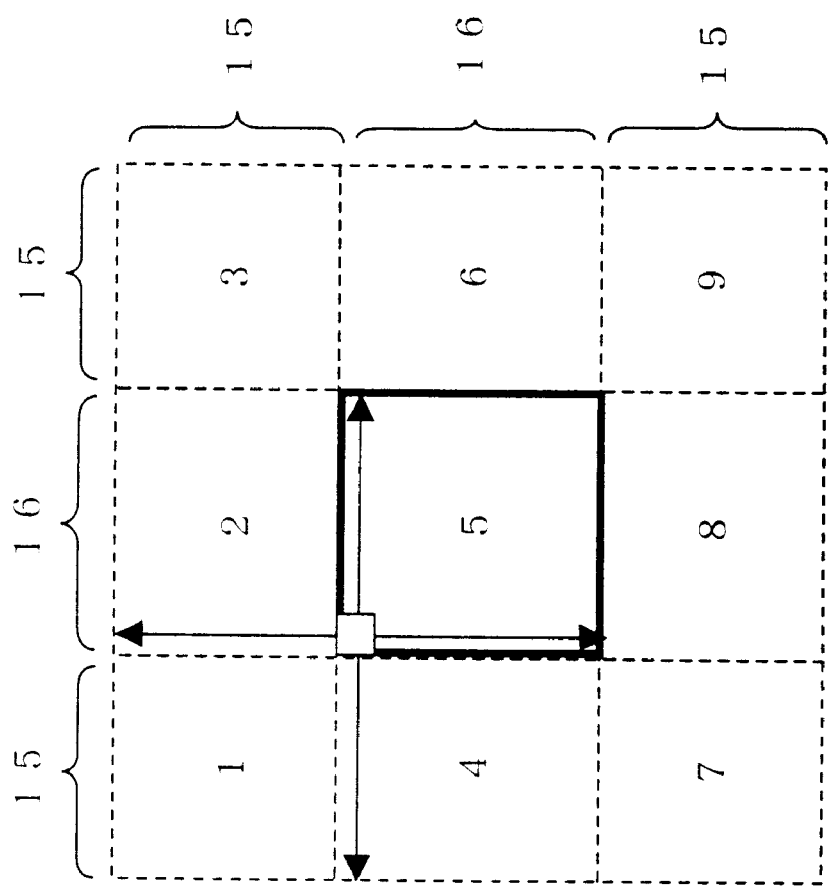
FIG. 6 is a schematic diagram showing a macroblock and corresponding search area.
Figure 7:
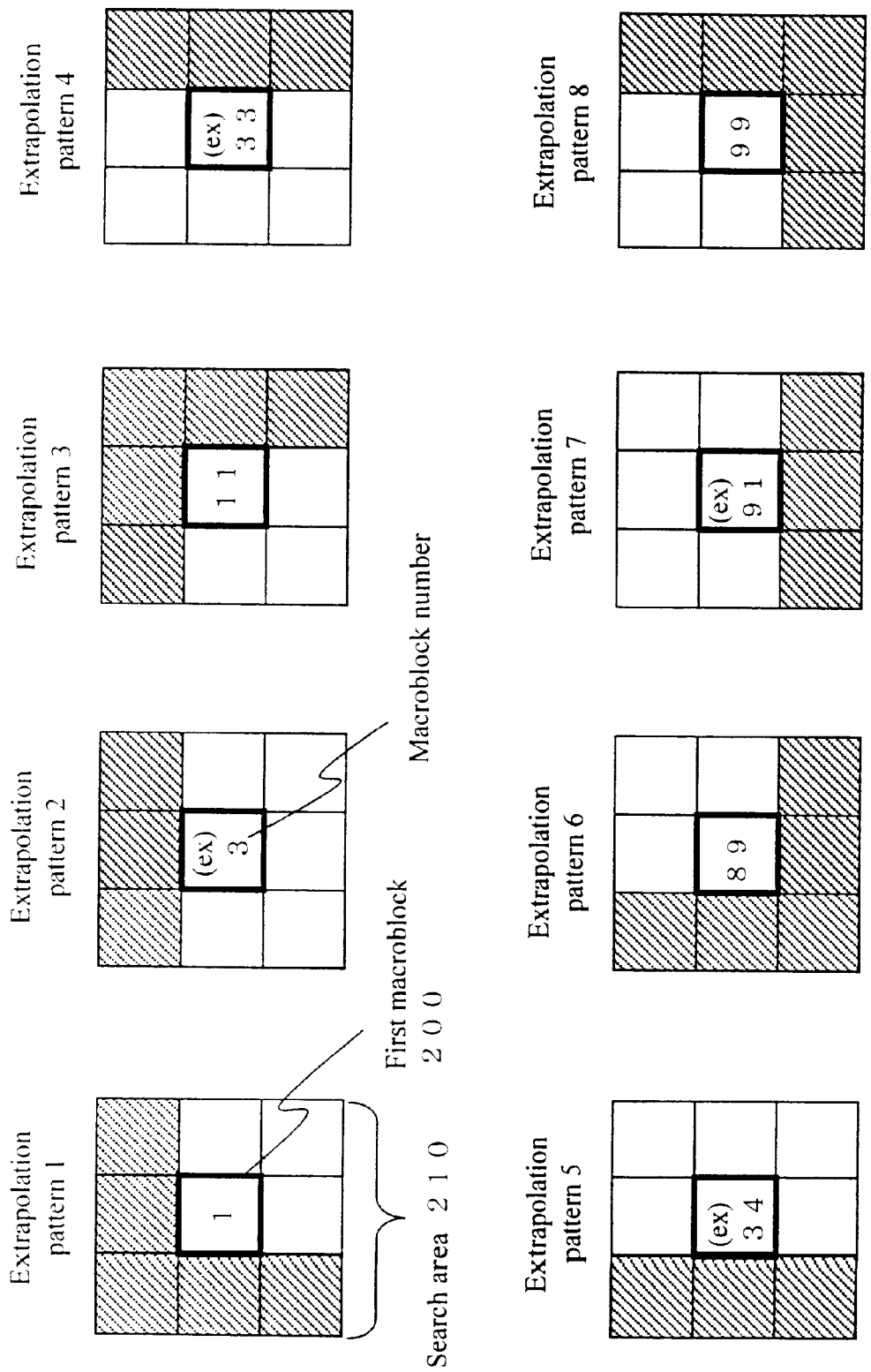
FIG. 7 is a schematic diagram showing the patterns of extrapolation and corresponding macroblock number.

The frame image data handled with this embodiment are composed of 9×11 macroblocks as shown in FIG. 5, and macroblock number 1 to 99 is assigned to each macroblock as shown in FIG. 5. One macroblock is composed of 16×16 pixel data. FIG. 6 is a schematic diagram showing a macroblock and corresponding search area for detecting motion vector. The macroblock is the one shown at the center indicated by 5, the search area is shown by 1 to 9 except 5, and it is composed of ±15 pixels. In this case, it is assumed M=15 and N=16 in the prediction memory shown in FIG. 3. Each macroblock has the search area set in surrounding area as shown in FIG. 6, the search area of the macroblock covers within frame image area or extending over outside the frame image area is uniquely decided according to the position of the macroblock in the frame image. The macroblocks in the hatched region in FIG. 5 are the macroblocks whose search area extend beyond the frame image area and it is defined as a surrounding edge macroblock. The surrounding edge macroblock is not limited to the macroblocks in the outermost past of the frame image, and when set search area M is large, the macroblocks near the innermost edge of the outermost mocroblocks might be included. In addition, the range of the search area which becomes outside of the frame image area, in other words, the range for the extrapolation, is decided uniquely by the position of the macroblock in the frame image. There are eight pattern range where this extrapolation is needed . FIG. 7 is a schematic diagram showing the patterns of extrapolation and corresponding macroblock number. In FIG. 7 in each pattern, the block shown in the center is a macroblock, and the surrounding region is the search area and the hatched areas are extrapolation area.

Extrapolation pattern 1 corresponds the macroblock number 1 shown in FIG. 5 and extrapolation pattern 2 corresponds to the macroblock number 2 to 10. In this way, the required extrapolation pattern is uniquely decided if the macroblock number is decided. Control unit 1 has the macroblock counter 11 as shown in FIG. 2, and detects the macroblock number for detecting the motion vector. The macroblock recognition part 12 checks the macroblock number of the input macroblock and it can judge whether the currently processed macroblock is the surrounding edge macroblock or not and if the current macroblock is the surrounding edge macroblock, the requested extrapolation pattern is uniquely decided according to the detected macroblock number. When the macroblock recognition part 12 judges the currently processed macroblock not to be the surrounding edge macroblock, it switches the program switching signal 107 to "0" in order to select the prediction memory no use program 13a, and the control unit 1 and the motion vector detecting part 4 go to the process for the motion vector detection by using the image data of the frame memory 2. When the macroblock recognition part 12 judges the currently processed macroblock to be the surrounding edge macroblock, it switches the program switching signal 107 to "1" in order to select the prediction memory use program 13b. The prediction memory use program 13b contains the image data transmitting program, and it outputs instructions such as address signal, read signal and write signal as necessary to transmit the image data of the macroblock and search area that exist in the frame memory 2 to the prediction memory 3. Moreover, the macroblock recognition part 12 outputs the extrapolation pattern signal, which indicates the extrapolation pattern among the extrapolation patterns shown in FIG. 7 based on the macroblock number, to the prediction memory 3. The prediction memory 3 goes to the process for forming the image data for the motion vector detection.

Figure 8:
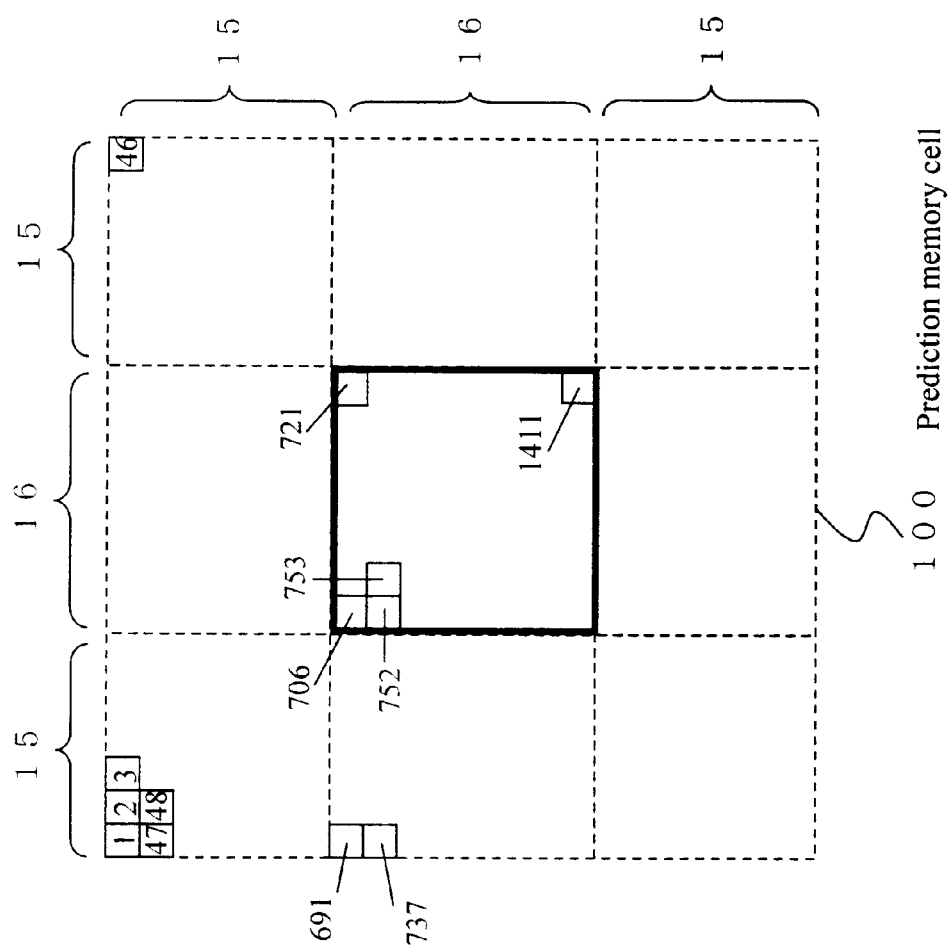
FIG. 8 is a schematic diagram showing the address assigned to the prediction memory cell 100

Processing for forming the image data on the prediction memory 3 now is described in detail. FIG. 3 is a schematic block diagram showing a main configuration of the prediction memory. 100 is a prediction memory cell, 110 is a row decoder, and 120 is a column decoder. The row decoder 110 and the column decoder 120 have the image data extrapolation function as described later. The prediction memory cell 100 has the memory capacity corresponding to 46×46 number of pixels because of N+2M=46. As shown in FIG. 8, the addressing of the prediction memory cell 100 starts from the left upper pixel as "1" and increases "1" by "1" to the right direction in each line and reaches to the right edge pixel, turns to the left edge pixel of the next lower line and increases "1" by "1" in the same manner. Address data 101 are output from control unit 1, and direct the access address number of prediction memory cell 100. The extrapolation pattern signal 102 is information indicating the extrapolation pattern among eight patterns shown in FIG. 7, which extrapolation pattern shows the relationship between the macroblock search area and the frame image area, and it is assumed that the bit length of the extrapolation pattern signal is three bits here.

The row decoder 110 memorizes the table shown in FIG. 14 and specifies the row address according to read write signal, extrapolation pattern signal 102, and address data 101. As shown in FIG. 14, one row address is output when the image data extrapolation to the row is not necessary and two or more row addresses are output when the image data extrapolation to the row is needed.

The column decoder 120 memorizes the table shown in FIG. 15 and specifies the column address according to read write signal, extrapolation pattern signal 102, and address data 101. As shown in FIG. 15, one column address is output when the image data extrapolation to the column is not necessary and two or more column addresses are output when the image data extrapolation to the column is needed.

In the data transmission to the prediction memory cell 100, FIG. 9a shows the transmission and writing from the frame memory 2 to the prediction memory cell 100 one pixel by one pixel when the image data extrapolation is not used. When write signal 104 turns active (turns to "1"), the data on the data bus 130 are written in the address number selected by the row address signal 111 and the column address signal 121 which are described later on. For instance, when the second row indicated by the row address signal 111 and the third column indicated by the column address signal 121 turn active (="1"), data are written in the hatched area whose address number is specified as shown in FIG. 9a.

FIG. 9b shows the transmission and writing from the frame memory 2 to the prediction memory cell 100 including the image data extrapolation when the image data extrapolation is required. For instance, when the second row and third row indicated by the row address signal 111 and the third column indicated by the column address signal 121 turn active (="1"), data are written in the hatched area whose address number is specified as shown in FIG. 9b. The row address decoder 110 outputs 1 row address or plural row addresses and the column address decoder 120 outputs 1 column address or plural column addresses by applying and performing the data writing principles to the plural address as shown in FIG. 9b according to the extrapolation pattern, and the image data extrapolation is performed rapidly and simply and the formed image data are used for the unrestricted motion vector detection.

Based on the arrangement described above, the entire flow of the image data extrapolation processing by the image data encoding decoding processing apparatus of this invention is shown in detail by the concrete example. In order to simplify the description, Nth row of the row address signal 111 is described as 111 [N], and Nth column of the column address signal 121 is described as 121 [N]. Moreover, if the signal is "1", it shows active status and if the signal is "0", it shows inactive status.

(Step 1)

Macroblock counter 11 detects the macroblock number of the currently processed macroblock, and the macroblock recognition part 12 detects whether the macroblock is a surrounding edge macroblock whose search area is extending over the frame image area or the macroblock is an internal macroblock whose whole search area is within the frame image area.

If the detected macroblock number is the number assigned for the hatched area located on the boundary of the frame image as shown in FIG. 5, the macroblock is detected as a surrounding edge macroblock. If the currently processed macroblock is an inside macroblock, the correlation between the input data and the past image data on the frame memory 2, and the motion vector is calculated. Here, the currently processed macroblock is assumed to be the surrounding edge macroblock whose macroblock number is "1". There are 8 patterns of the extrapolation for surrounding edge macroblock as shown in FIG. 7, and in this case, the extrapolation pattern 1 is assumed to be an example. The processing operations for the macroblocks of other extrapolation patterns are omitted because the processing can be understood easily from the description of the processing operation for the extrapolation pattern 1.

(Step 2)

The control unit sets the value of the extrapolation pattern signal 102 in the control register when the macroblock number is "1", and the value of the extrapolation pattern signal 102 becomes "1". The macroblock data of macroblock number 1 are transmitted from the frame memory 2 to the corresponding position of the center part of prediction memory cell 100 (rectangle area whose corner address numbers are "706" and "1411") via data bus 130. The transmitted pixel data are written from 706 as shown in FIG. 8. As described below, when the macroblock data are written in the prediction memory cell, data are written not only to the corresponding position of the prediction memory address but also to the corresponding extrapolation position.

Figure 10:
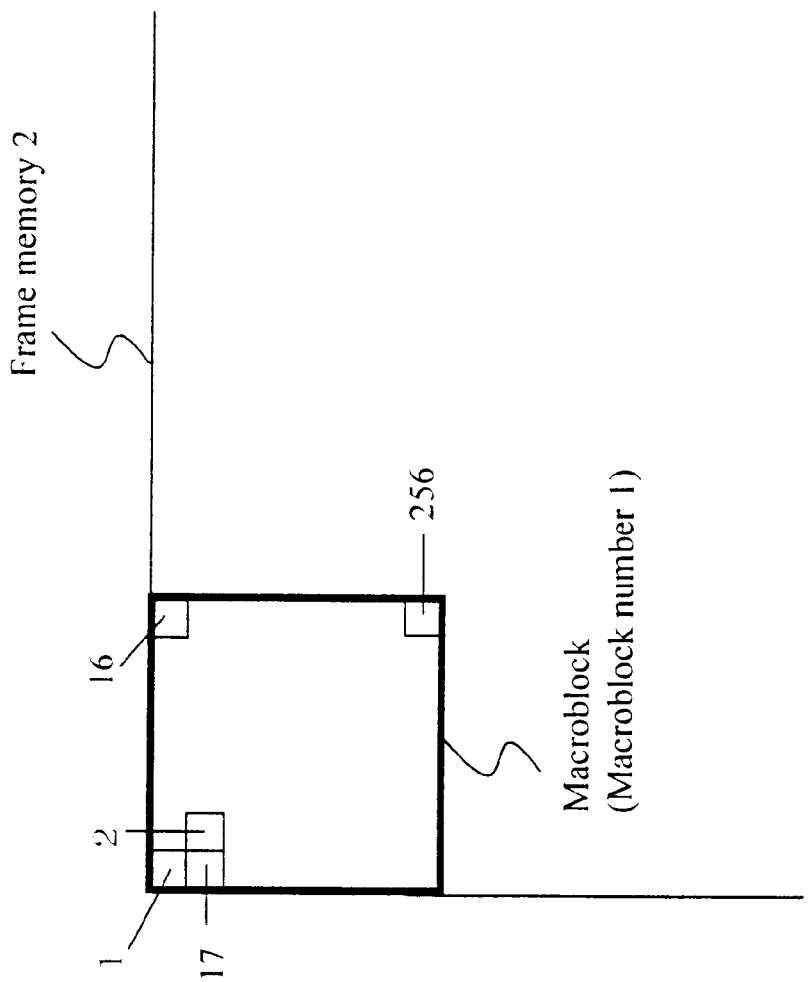
FIG. 10 is a schematic diagram showing the address assigned to the pixel data of a macroblock of the frame memory 2.
Figure 11:
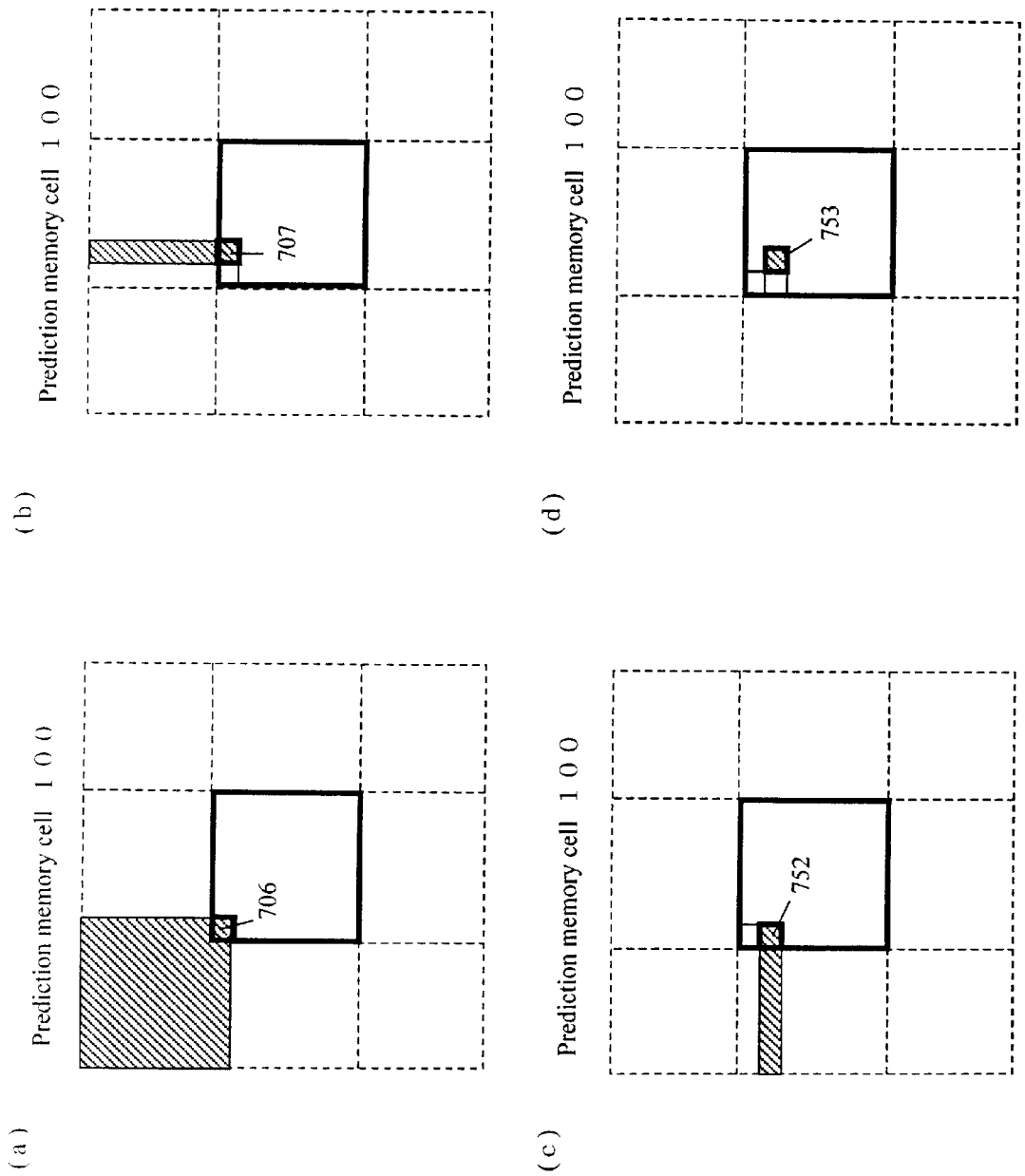
FIG. 11 is a schematic diagram showing the writing area including extrapolation on the prediction memory cell 100 corresponding to the pixel data number 1, 2, 17, 18 of the macroblock number 1.

First of all, when the first pixel of the macroblock number 1 in the frame memory 2 as shown in FIG. 10 is transmitted to the prediction memory cell 100, the row decoder 110 outputs the row address signal 111 [N]="1" (N=1, 2, . . . , 16) and the row address signal 111 [N] ="0" (N =17, 18, . . . , 46) according to the table shown in FIG. 14 on the condition that the address data 101="706", the extrapolation pattern signal 102="1", the read signal 103 ="0", and the write signal 104 ="1". In the same manner, the column decoder 120 outputs the column address signal 121 [N]="1" (N=1, 2, . . . , 16) and the column address signal 121 [N]="0" (N=17, 18, . . . , 46) according to the table shown in FIG. 15 on the condition that the address data 101="706", the extrapolation pattern signal 102="1", the read signal 103="0", and the write signal 104="1". By the above-mentioned address selection, data the same as the first pixel data of the macroblock number 1 are written in the hatched area shown in FIG. 11a (step 2b).

The address of the following data transmitting destination is 707 as shown in FIG. 10. When the second pixel of the macroblock number 1 in the frame memory 2 as shown in FIG. 10 is transmitted to the prediction memory cell 100, the row decoder 110 outputs the row address signal 111 [N]="1" (N=1, 2, . . . , 16) and the row address signal 111 [N]="0" (N=17, 18, . . . , 46) according to the table shown in FIG. 14 on the condition that the address data 101="707", the extrapolation pattern signal 102 ="1", the read signal 103= "0", the write signal 104="1". In the same manner, the column decoder 120 outputs the column address signal 121 [17]="1" and the column address signal 121 [N]="0" (N=1, 2, . . . , 46 ; N#17) according to the table shown in FIG. 15 on the condition that the address data 101="707", the extrapolation pattern signal 102 ="1", the read signal 103= "0", the write signal 104="1". By the above-mentioned address selection, data the same as the second pixel data of the macroblock number 1 are written in the hatched area shown in FIG. 11b (step 2c).

When the third pixel to the fifteenth pixel of the macroblock number 1 in the frame memory 2 as shown in FIG. 10 are transmitted to the prediction memory cell 100, the same process step 2c is performed. As a result, the same data of the macroblock boundary are written from the boundary pixel to the uppermost pixel in each column respectively (step 2d). When the sixteenth pixel of the macroblock number 1 in the frame memory 2 as shown in FIG. 10 is transmitted to the prediction memory cell 100, the same process step 2c not 2b is performed though it is located on the corner. The reason for this is that there is no necessity of the extrapolation in the right side from this column because the data of the right positions exist in the frame memory 2 as image data (step 2e).

Next, as for the following seventeenth pixel of the macroblock number 1 in the frame memory 2 as shown in FIG. 10, the address of the prediction memory cell 100 for the transmitting destination is "752" as shown in FIG. 8. When the seventeenth pixel of the macroblock number 1 in the frame memory 2 as shown in FIG. 10 is transmitted to the prediction memory cell 100, the row decoder 110 outputs the row address signal 111 [17]="1" and the row address signal 111[N]="0" (N=1, 2, . . . , 46; N#17) according to the table shown in FIG. 14 on the condition that the address data 101="752", the extrapolation pattern signal 102 "1", the read signal 103="0", the write signal 104="1". In the same manner, the column decoder 120 outputs the column address signal 121 [N]="1" (N=1, 2, . . . , 16) and the column address signal 121 [N]="0" (N=17, 18, . . . , 46) according to the table shown in FIG. 15 on the condition that the address data 101="752", the extrapolation pattern signal 102="1", the read signal 103="0", the write signal 104="1". By the above-mentioned address selection, data the same as the seventeenth pixel data of the macroblock number 1 are written in the hatched area shown in FIG. 11c (step 2f).

Next, as for the following data 18th pixel of the macroblock number 1 in the frame memory 2, the address of the prediction memory cell 100 for the transmitting destination is "753" as shown in FIG. 8 and it is not the boundary pixel. When the eighteenth pixel of the macroblock number 1 in the frame memory 2 as shown in FIG. 10 is transmitted to the prediction memory cell 100, the row decoder 110 outputs the row address signal 111 [18]="1" and the row address signal 111 [N]="0" (N=1, 2, . . . , 46; N#18) according to the table shown in FIG. 14 on the condition that the address data 101="753", the extrapolation pattern signal 102="1", the read signal 103="0", the write signal 104="1". In the same manner, the column decoder 120 outputs the column address signal 121 [17]="1" and the column address signal 121 [N]="0" (N=1, 2, . . . , 46; N#17) according to the table shown in FIG. 15 on the condition that the address data 101="753", the extrapolation pattern signal 102="1", the read signal 103="0", the write signal 104="1". By the above-mentioned address selection, data the same as the eighteenth pixel data of the macroblock number 1 are written only in the hatched area shown in FIG. 11d (step 2g).

Figure 12:
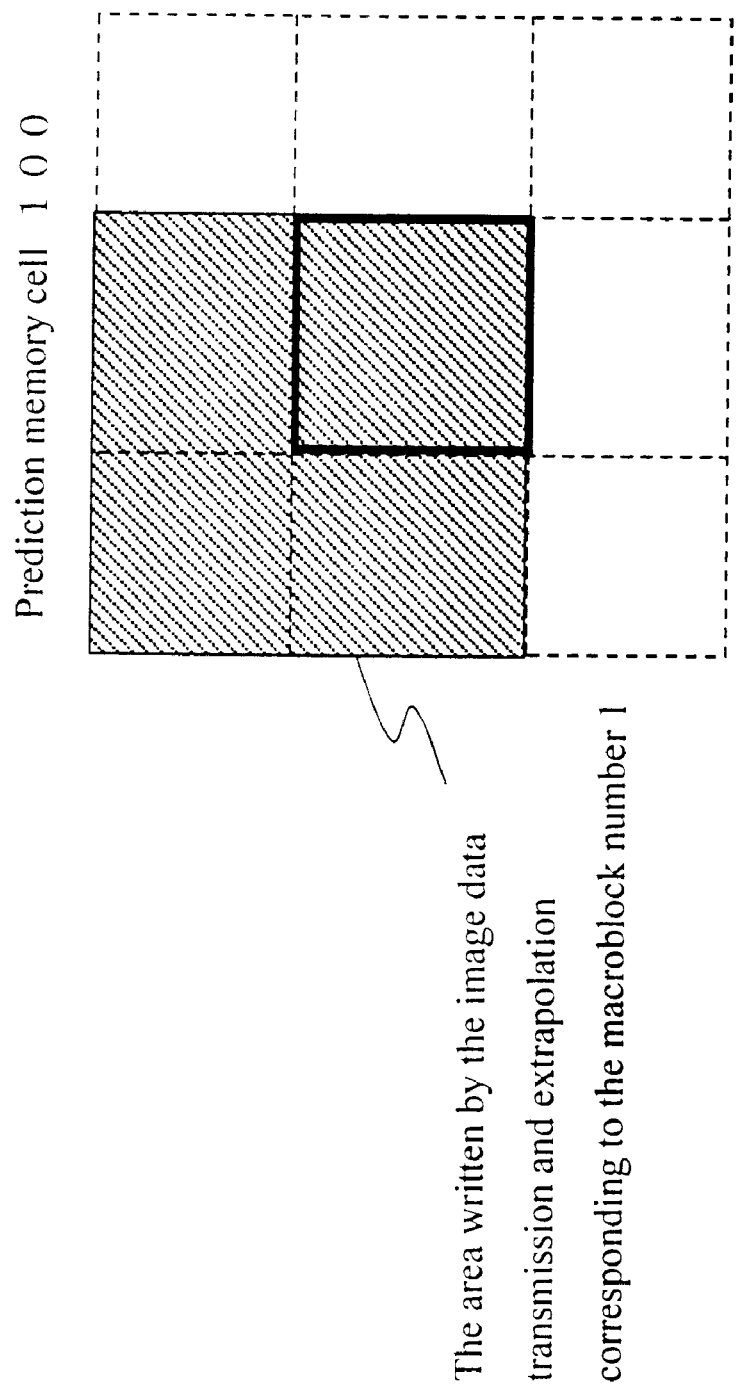
FIG. 12 is a schematic diagram showing the writing area including extrapolation on the prediction memory cell 100 corresponding to macroblock number 1.

As shown above, the data transmission and the data writing of the data located on the boundary of the macroblock number 1 to the prediction memory cell 100 are performed by the above mentioned step selected from 2c to 2f repeatedly, and the data transmission and the data writing of the data not located on the boundary of the macroblock number 1 to the prediction memory cell 100 are performed by the above mentioned step 2g repeatedly. After all, when transmitting 256 times are finished, image data are written in the hatched area shown in FIG. 12.

(Step 3)

Figure 13:
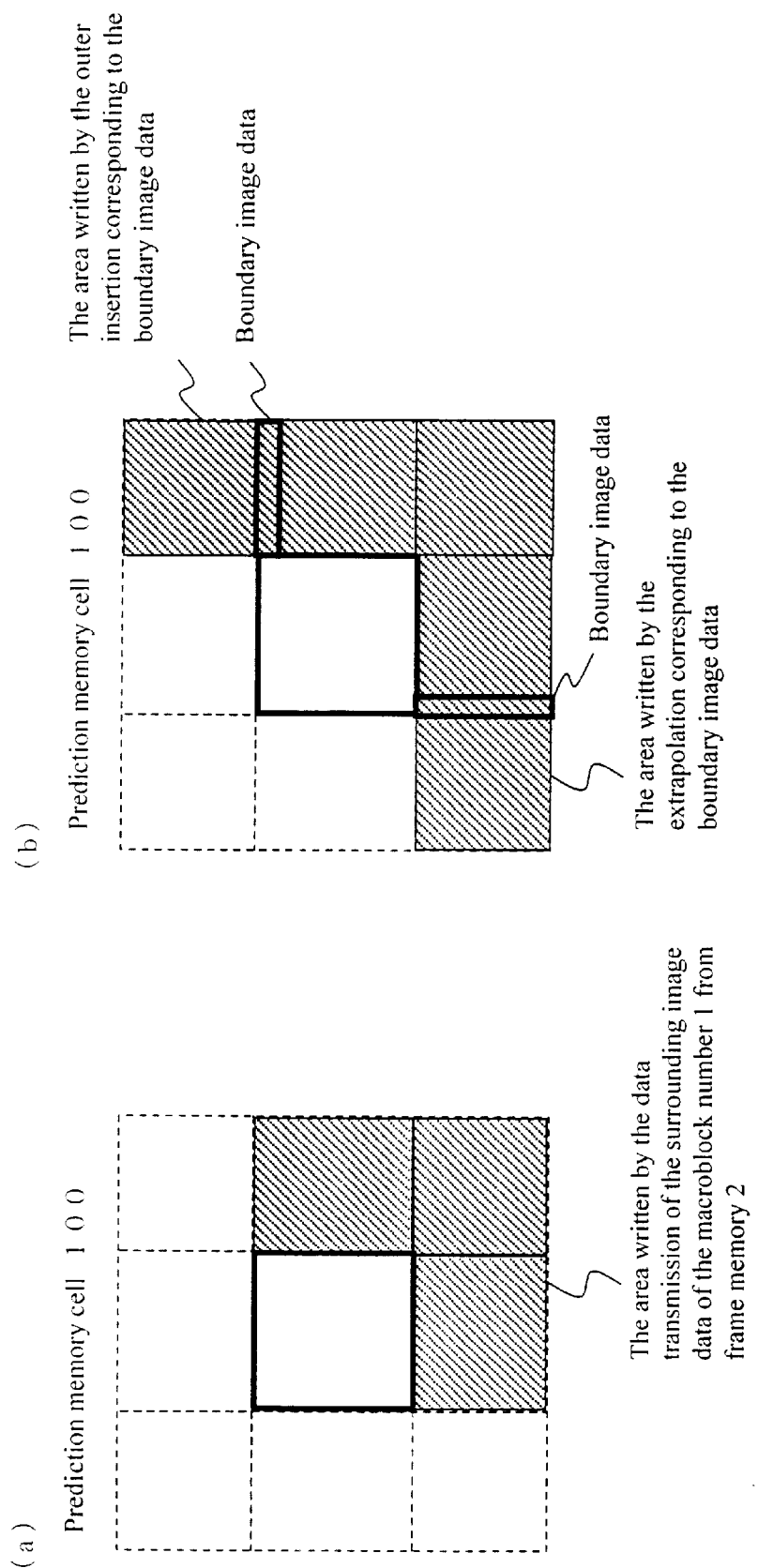
FIG. 13 is a schematic diagram showing the writing area including extrapolation on the prediction memory cell 100 corresponding to the transmitted data of the rest of the macroblock from the frame memory 2.
Figure 16:
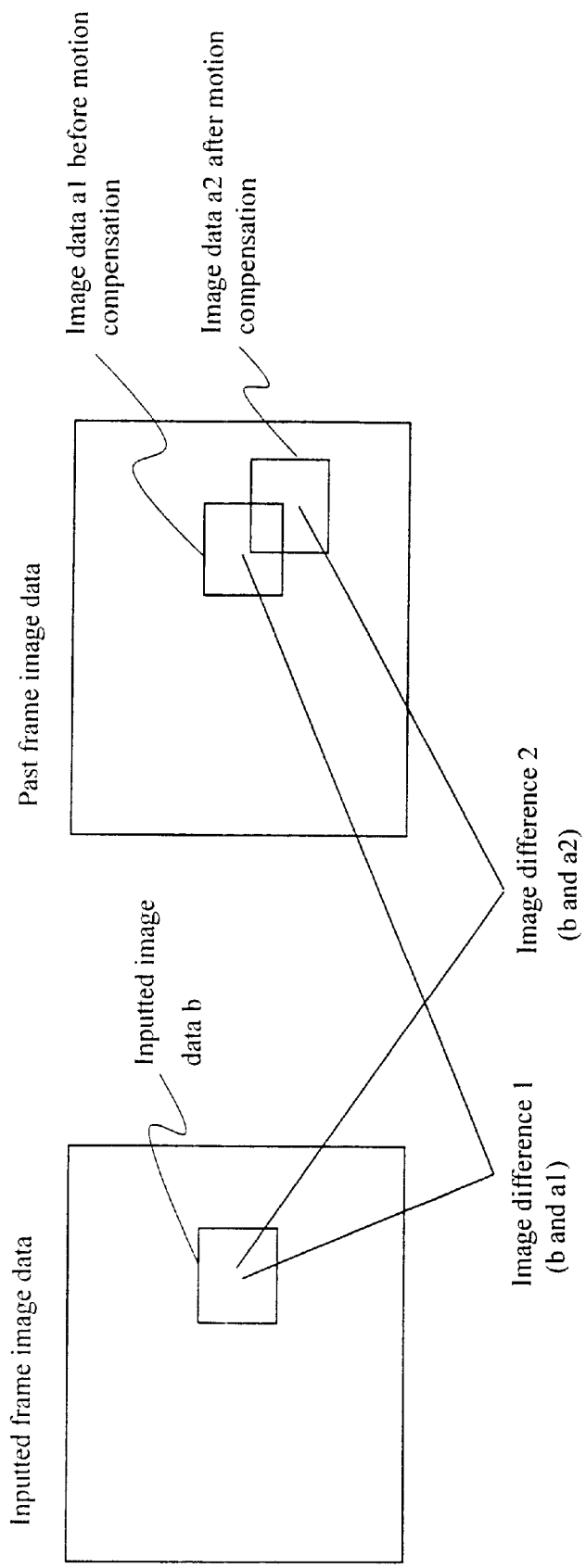
FIG. 16 is a schematic diagram showing a difference between past image data and current input image data.
Figure 17:
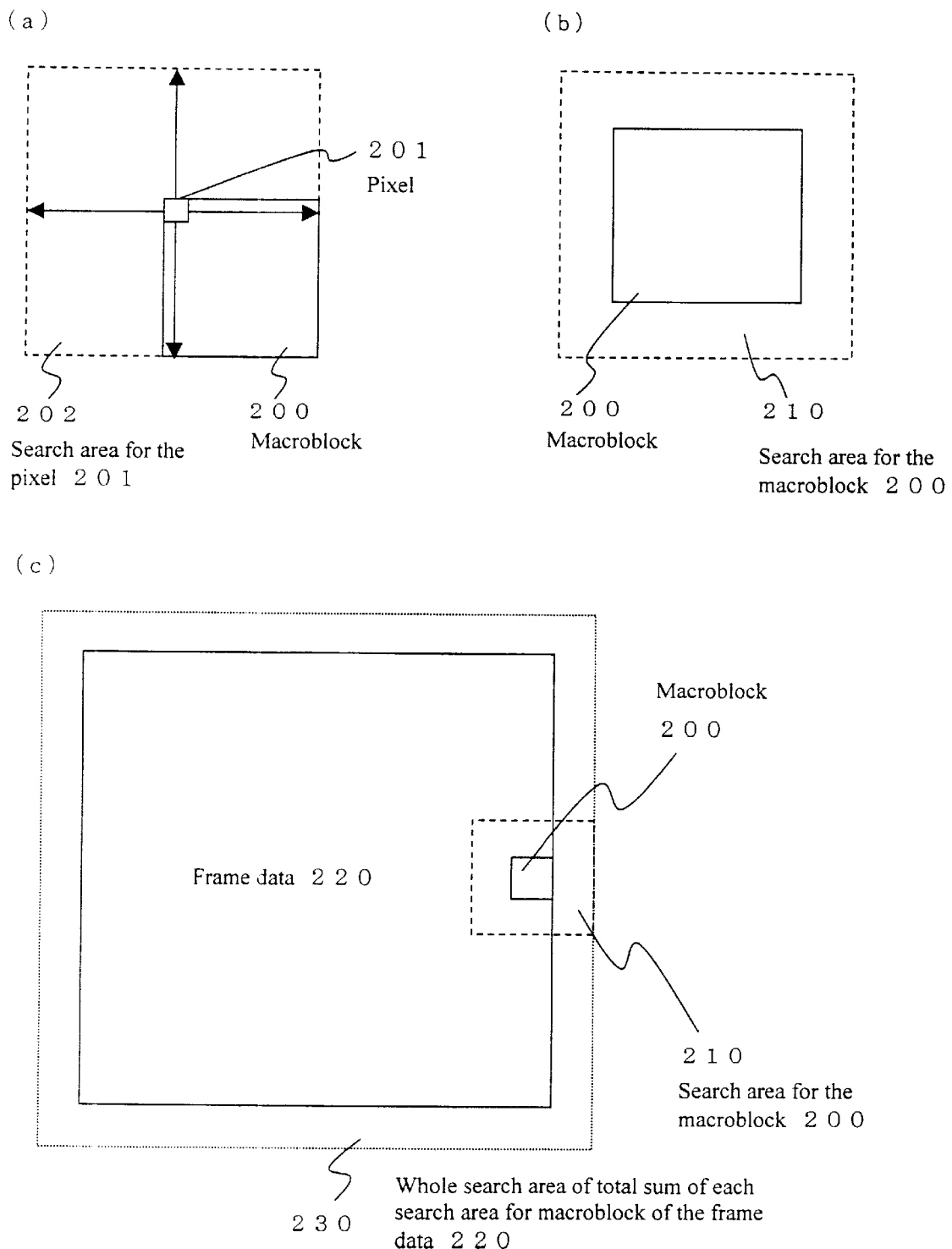
FIG. 17 is a schematic diagram showing a search area of a macroblock.

The pixel data surrounding around the macroblock number 1 and existing in the frame memory 2 (hatched area as shown in FIG. 13a) are transmitted from the frame memory 2 to the corresponding position of the prediction memory cell 100 via the data bus 130.

(Step 4)

The hatched area as shown in FIG. 13b is written by the extrapolation by repeating step 2d or step 2f based on the boundary data of the transmitted data in step 3 as shown hatched area in FIG. 13a.

By the above mentioned process of step 2 to step 4, all data can be written to all addresses of pixels of the prediction memory 3. As described above, all data of the search area corresponding to the macroblock number 1 can be provided completely onto the prediction memory cell 100.

(Step 5)

The frame assigned to the macroblock 5 on the prediction memory cell 100 is shifted upper side lower side, right side and left side, and respective correlation between input image data and the image data after the above shift is calculated. The amount of the movement of the data when the correlation takes the largest value the becomes unrestricted motion vector.

Therefore, the unrestricted motion vector can be calculated by the moving picture encoding decoding processing apparatus of the invention. For forming the image data onto the prediction memory, the transmitting means writes each pixel data in the corresponding address of the prediction memory when the image data used by the extrapolation means is transmitted, and the image data extrapolation means performs the extrapolation of the image data based on the extrapolation pattern signal. When data is written in the extrapolation area by the image data extrapolation means, if there is the same row address data in the first macroblock data with extrapolation area, the boundary image data of the first macroblock whose column address is the nearest to the extrapolation area is written, if there is the same column address data in the first macroblock data with extrapolation area, the boundary image data of the first macroblock whose row address is the nearest to the extrapolation area is written, and if there is no same row address data and column address data in the first macroblock data with extrapolation area the boundary image data of the first macroblock whose row address and column address are the nearest to the extrapolation area is written.

The above described process corresponds to the macroblock number 1 and the extrapolation pattern 1. As for the process for the other surrounding edge macroblock and other extrapolation pattern can be the same as described above. The image data extrapolation is performed according to the row address and the column address generated by the row decoder and the column decoder with table as shown in FIG. 14 and FIG. 15.

Though it was assumed N=16 and M=15 in abovementioned embodiment's description and the extrapolation steps for the macro block number 1, which is the outermost macroblock of the frame image in this case, are described, it is needless to say that the value of N and M are not limited to the above number. Various numbers can be used in this invention. When the value of M becomes large, the macroblocks near the innermost edge of the outermost macroblocks might be the surrounding edge macroblocks. In this case, the transmitted pixel data located on the boundary with the search area will be extrapolated to the corresponding extrapolation area by the same manner as above described steps in stead of the pixel data located on the boundary of the macroblock number 1.

The moving picture encoding decoding processing apparatus of the present invention can perform the image data extrapolation which can cover and form the image data for search area onto the prediction memory for detecting the unrestricted motion vector used in the image data encoding decoding process of the H.263, and the extrapolation can be achieved by the simple image data transmission and writing to the specified plural addresses repeatedly. Therefore, the unrestricted motion vector can be detected rapidly and simply.

The processing time can be shortened compared with the conventional method because the repetition of plural condition judgments and conditional branch processing can be omitted, which was necessary for the conventional method (for instance, 3 steps to 10 steps).

Moreover, the reduce processing time can be assigned for other image processing such as real time processing, and the picture quality of the moving picture can be improved.

Furthermore, the amount of the memory consumption capacity for preparing and assigning to the prediction memory needs enough only for the capacity of the motion vector search area.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A moving picture encoding decoding processing apparatus comprising:
   a frame memory;
   a prediction memory for storing image data of a search area for a motion vector detection;
   an image data transmission means for transmitting image data of a first macroblock and surrounding image data existing in the frame memory from the frame memory to the prediction memory and writing the transmitted data to a corresponding area wherein the first macroblock is a macroblock whose search area extends beyond the frame image area;
   an image data extrapolation means for forming image data to an extrapolation area of the search area where an image data had not been written onto the prediction memory by the extrapolation based on the pixel data located on a boundary with the search area; and
   a motion vector detecting part for detecting the unrestricted motion vector based on the image data of the search area formed on the prediction memory.

2. The moving picture encoding decoding processing apparatus according to claim 1, further comprising a macroblock recognition part for recognizing whether an input macroblock is a macroblock whose whole motion vector search area is within the frame image data area or a macroblock whose motion vector search area at least partly extends beyond the frame image data area, wherein the motion vector detecting part detects the motion vector based on the image data formed on the frame memory if an inputted macroblock is the macroblock whose whole motion vector search area is within the frame image data area, and detects the motion vector based on the image data formed on the prediction memory if an inputted macroblock is the macroblock whose motion vector search area at least partly extends beyond the frame image data area.

3. The moving picture encoding decoding processing apparatus according to claim 2 wherein the macroblock recognition part recognizes an inputted macroblock as the macroblock whose motion vector search area extends beyond the frame image data area if the position of the inputted macroblock is in a surrounding edge area of the frame image and recognizes an inputted macroblock as the macroblock whose whole motion vector search area is within the frame image data area if the position of the inputted macroblock is in an internal area excluding the surrounding edge area of the frame image.

4. The moving picture encoding decoding processing apparatus according to claim 1 wherein the prediction memory is composed of (N+2M)×(N+2M) capacity of memory when the macroblock is composed of N×N pixels and the search area has M data pixel length to upper side, lower side, right-hand side, and left-hand side.

5. The moving picture encoding decoding processing apparatus according to claim 1 wherein the image data extrapolation means comprises a first extrapolation means for writing the pixel data located on the boundary with the search area to the same row address of the extrapolation area which pixel data is positioned in the nearest pixel to the extrapolation area when transmitted image data are mapped on the prediction memory if there are image data having the same row address with the extrapolation area in the transmitted image data, a second extrapolation means for writing the pixel data located on the boundary with the search area to the same column address of the extrapolation area which pixel data is positioned in the nearest pixel to the extrapolation area when transmitted image data are mapped on the prediction memory if there are image data having the same column address with the extrapolation area in the transmitted image data, a third extrapolation means for writing the corner pixel data located on the boundary with the search area to the faced extrapolation area which pixel data is positioned in the nearest corner pixel to the extrapolation area when transmitted image data are mapped on the prediction memory if there are no image data having the same row address or the same column address with the extrapolation area in the transmitted image data.

6. The moving picture encoding decoding processing apparatus according to claim 1 wherein the macroblock recognition part outputs an extrapolation pattern signal indicating the position of the macroblock in the surrounding edge if the inputted macroblock is in the surrounding edge, and the image data extrapolation means performs the extrapolation based on the extrapolation pattern.

7. The moving picture encoding decoding processing apparatus according to claim 6 wherein the image data extrapolation means comprises a row decoder generating one or plural sets of row addresses for the prediction memory by decoding based on the address signal indicating accessing address of the prediction memory, the extrapolation pattern signal and the read/write signal for the prediction memory; and a column decoder generating one or plural sets of column addresses for the prediction memory by decoding based on the address signal indicating accessing address of the prediction memory, the extrapolation pattern signal and the read/write signal for the prediction memory.

* * * * *